United States Patent
Cormier et al.

(10) Patent No.: US 9,415,708 B2
(45) Date of Patent: Aug. 16, 2016

(54) CONFORMABLE ENERGY ABSORBER

(71) Applicant: OAKWOOD ENERGY MANAGEMENT, INC., Dearborn, MI (US)

(72) Inventors: Joel M. Cormier, East Lathrup Village, MI (US); Richard F. Audi, Dearborn, MI (US); Donald S. Smith, Commerce Township, MI (US)

(73) Assignee: OAKWOOD ENERGY MANAGEMENT, INC., Dearborn, MI (US)

( * ) Notice: Subject to any disclaimer, the term of this patent is extended or adjusted under 35 U.S.C. 154(b) by 4 days.

(21) Appl. No.: 14/182,770

(22) Filed: Feb. 18, 2014

(65) Prior Publication Data

US 2015/0232053 A1    Aug. 20, 2015

(51) Int. Cl.
*B60N 2/42*    (2006.01)
*B60N 2/70*    (2006.01)

(52) U.S. Cl.
CPC ... *B60N 2/42* (2013.01); *B60N 2/70* (2013.01)

(58) Field of Classification Search
CPC ..................................... B60N 2/42; B60N 2/70
USPC ............... 297/216.1, 216.13, 216.14, 452.18, 297/452.2; 188/371, 377
See application file for complete search history.

(56) References Cited

U.S. PATENT DOCUMENTS

| | | |
|---|---|---|
| 1,784,511 A | 12/1930 | Carns |
| 2,090,881 A | 8/1937 | Wilson |
| 2,391,997 A | 1/1946 | Noble |
| 3,011,602 A | 12/1961 | Ensrud |
| 3,018,015 A | 1/1962 | Agriss et al. |
| 3,071,216 A | 1/1963 | Jones et al. |
| 3,196,763 A | 7/1965 | Rushton |
| 3,231,454 A | 1/1966 | Williams |
| 3,535,663 A | 10/1970 | Herzog et al. |

(Continued)

FOREIGN PATENT DOCUMENTS

| | | |
|---|---|---|
| DE | 19947245 A1 | 4/2000 |
| EP | 0434834 A1 | 7/1991 |

(Continued)

OTHER PUBLICATIONS

International Search Report and the Written Opinion, International application No. PCT/US06/13656; Applicant Oakwood Energy Management, Inc.

(Continued)

*Primary Examiner* — Philip Gabler
(74) *Attorney, Agent, or Firm* — Brooks Kushman P.C.

(57) ABSTRACT

An energy absorber 10 that has a spine 12 which has a relaxed configuration and a deployment configuration. In the deployment configuration, the spine 12 lies proximate to a substrate 14 to protect the substrate 14 from an impacting object 16. Preferably, the spine 12 is bendable to conform to the substrate 14. The spine includes a number (N) of energy absorbing modules 18, 20, 22, 24, . . ., where 1<=N<=1000. At least some of the modules have a number (L) of mutually supporting energy absorbing vertebral members 30, where 1<=L<=100. Each vertebral member 30 includes a number (U) of coalesced energy absorbing units 32, 34, were 2<=U<=10. At least some of the energy absorbing units 32, 34 have a base 36 that preferably but not necessarily is oriented toward the impacting object 16.

7 Claims, 3 Drawing Sheets

(56) References Cited

U.S. PATENT DOCUMENTS

| | | | |
|---|---|---|---|
| 3,605,145 A | 9/1971 | Graebe | |
| 3,938,963 A | 2/1976 | Hale | |
| 4,072,334 A | 2/1978 | Seegmiller et al. | |
| 4,597,601 A | 7/1986 | Manning | |
| 4,890,877 A * | 1/1990 | Ashtiani-Zarandi et al. | 296/146.7 |
| 5,150,935 A | 9/1992 | Glance et al. | |
| 5,390,467 A | 2/1995 | Shuert | |
| 5,391,251 A | 2/1995 | Shuert | |
| 5,401,347 A | 3/1995 | Shuert | |
| 5,444,959 A | 8/1995 | Tesch | |
| 5,470,641 A | 11/1995 | Shuert | |
| 5,549,327 A | 8/1996 | Rusche et al. | |
| 5,572,804 A | 11/1996 | Skaja et al. | |
| 6,017,084 A | 1/2000 | Carroll, III et al. | |
| 6,098,313 A | 8/2000 | Skaja | |
| 6,142,563 A * | 11/2000 | Townsend et al. | 297/216.1 |
| 6,199,937 B1 | 3/2001 | Zetouna | |
| 6,199,942 B1 | 3/2001 | Carroll, III et al. | |
| 6,221,292 B1 | 4/2001 | Carroll, III | |
| 6,247,745 B1 | 6/2001 | Carroll, III et al. | |
| 6,406,081 B1 | 6/2002 | Mahfet et al. | |
| 6,443,513 B1 | 9/2002 | Glance | |
| 6,453,476 B1 | 9/2002 | Moore, III et al. | |
| 6,550,850 B2 | 4/2003 | Laborie et al. | |
| 6,669,251 B2 | 12/2003 | Trappe | |
| 6,679,967 B1 | 1/2004 | Carroll, III et al. | |
| 6,681,907 B2 | 1/2004 | Le | |
| 6,682,128 B2 | 1/2004 | Carroll, III et al. | |
| 6,726,262 B2 | 4/2004 | Marijnissen et al. | |
| 6,733,064 B2 * | 5/2004 | Byma et al. | 296/68.1 |
| 6,746,061 B1 | 6/2004 | Evans | |
| 6,749,784 B2 | 6/2004 | Blanchon | |
| 6,752,450 B2 | 6/2004 | Carroll, III et al. | |
| 6,777,062 B2 | 8/2004 | Skaja | |
| 6,848,730 B2 | 2/2005 | Evans | |
| 6,863,322 B2 | 3/2005 | Hunter et al. | |
| 6,923,494 B2 | 8/2005 | Shuler et al. | |
| 6,926,321 B2 | 8/2005 | Zipfel | |
| 6,938,936 B2 | 9/2005 | Mooijman et al. | |
| 7,073,831 B2 | 7/2006 | Evans | |
| 7,328,462 B1 | 2/2008 | Straus | |
| 7,360,822 B2 | 4/2008 | Cormier et al. | |
| 7,377,577 B2 | 5/2008 | Cormier et al. | |
| 7,384,095 B2 | 6/2008 | Cormier et al. | |
| 7,404,593 B2 | 7/2008 | Cormier et al. | |
| 7,625,023 B2 | 12/2009 | Audi et al. | |
| 7,628,444 B2 | 12/2009 | Cormier et al. | |
| 7,676,854 B2 | 3/2010 | Berger et al. | |
| 7,731,292 B2 * | 6/2010 | Ishijima et al. | 297/452.18 |
| 7,766,386 B2 | 8/2010 | Spingler | |
| 7,802,320 B2 | 9/2010 | Morgan | |
| 7,895,681 B2 | 3/2011 | Ferrara | |
| 7,908,678 B2 | 3/2011 | Brine, III et al. | |
| 7,954,177 B2 | 6/2011 | Ide et al. | |
| 7,958,573 B2 | 6/2011 | Lewis, Jr. et al. | |
| 8,201,671 B2 | 6/2012 | Cho | |
| 8,465,087 B2 | 6/2013 | Gerwolls et al. | |
| 2002/0017805 A1 | 2/2002 | Carroll, III et al. | |
| 2002/0113459 A1 | 8/2002 | Laborie et al. | |
| 2003/0080573 A1 | 5/2003 | Marijnissen et al. | |
| 2004/0036302 A1 | 2/2004 | Shuler et al. | |
| 2004/0094977 A1 | 5/2004 | Shuler et al. | |
| 2004/0174025 A1 | 9/2004 | Converse et al. | |
| 2005/0057053 A1 | 3/2005 | Evans et al. | |
| 2005/0161982 A1 | 7/2005 | Cormier et al. | |
| 2005/0230204 A1 | 10/2005 | Tamada et al. | |
| 2005/0230205 A1 | 10/2005 | Springler et al. | |
| 2005/0269824 A1 | 12/2005 | Steeg et al. | |
| 2006/0028038 A1 | 2/2006 | Glasgow et al. | |
| 2007/0228745 A1 | 10/2007 | Cormier et al. | |
| 2008/0120764 A1 | 5/2008 | Sajic | |
| 2010/0244469 A1 | 9/2010 | Gerwolls et al. | |
| 2010/0299812 A1 | 12/2010 | Maddux et al. | |
| 2010/0326782 A1 | 12/2010 | Vandenberge et al. | |

FOREIGN PATENT DOCUMENTS

| | | |
|---|---|---|
| EP | 0630592 A1 | 12/1994 |
| EP | 0863056 A1 | 9/1998 |
| EP | 1555109 A1 | 7/2005 |
| FR | 2870802 A | 12/2005 |
| JP | 136582 | 10/1975 |
| JP | 9150692 A | 11/1995 |
| JP | 08085404 A | 4/1996 |
| JP | 11348699 A | 12/1999 |
| KR | 20060065554 A | 6/2006 |
| WO | 0031434 | 6/2000 |

OTHER PUBLICATIONS

European Search Report and the Written Opinion, for Application No. 06112732.0-2412; dated Aug. 16, 2006, Applicant Oakwood Energy Management, Inc., 9 pages.

International Search Report and the Written Opinion, International application No. PCT/US/2012/070006; date of mailing Feb. 15, 2013.

International Search Report and the Written Opinion, International application No. 2013/036703; date of mailing Jul. 19, 2013.

* cited by examiner

CONFORMABLE ENERGY ABSORBER

TECHNICAL FIELD

A conformable energy absorber interposed between a substrate and an impacting object cushions mechanical forces sustained as a consequence of impact. Partial or complete absorption of such forces protects the impacting object such as the head of a vehicle occupant, the protected substrate such as a seat frame or both.

BACKGROUND

Automotive seats assemblies and restraint systems have long been used with active systems, such as airbags, in an attempt to minimize the risk of serious injury to vehicle occupants involved in a crash. These crashes include frontal, rear, side, rollover and combinations thereof that impart forces on the occupant in numerous directions. The occupants of these vehicles vary in size, weight, and height, and girth. Additionally, seat adjustments create further complexities of occupant positioning relative to the adjacent structures. The combinations of impact speed, impact type, occupant size, and occupant position create a nearly infinite number of impact scenarios which could never practically be tested for. Government and Insurance agencies have created test protocols to cover the most likely impact scenarios. However, serious injuries and fatalities still occur.

Seat manufacturers are continuously challenged to reduce the profile of the seat in an effort to increase the volume of space available for the occupant. As these seat assemblies decrease in thickness, less stroke is provided for impact management in the assembly, thereby necessitating higher efficiency in energy absorbing performance so that more energy can be absorbed in less space. Large foam buns have traditionally been used for both comfort and energy management. However, foam has proven to be less than ideal as an energy absorber due to its slow ramp up in load and poor crush efficiency. Furthermore, the foam density one would choose based on comfort characteristics is far too soft for energy management during a vehicle crash. Therefore a second stage energy absorber is desirable that has improved energy management properties and crush efficiency over the prior art with the resiliency to withstand every day operating loads that are less than one would experience in a vehicle crash.

Automotive interior systems, including vehicle seats, seat backs, consoles, door trim, pillar trim and other interior panels, are designed to withstand the day to day abuse they are likely to see in practical use. The driver's seat in particular, must be capable of withstanding tens of thousands of ingresses and egresses in conjunction with supporting the driver during the operation of the vehicle. Fabric or leather covered polyurethane (PU) foam has been traditionally been used in conjunction with a metal seat frame supporting structure to satisfy both comfort and crash criteria. Mechanical adjusters, heating, cooling, and airbags are also integrated into the seat assembly to enhance comfort and crash characteristics.

Efforts made with PU foam in particular to enhance the performance of the foam system for both comfort and crash include two main groups. Group one consists of using a reactive "dual" density approach where one density is used for comfort and one or more densities are molded for energy absorption following a crash. These may utilize not only changes in density but chemistry as well to obtain desired performance characteristics or both in the seat bun and the seat back. Group two consists of insert molding another foam component, made of EPP foam or some other foam type, and foaming the comfort PU foam around these energy§ absorbing foam components. Group two provides more flexibility to optimize the system crash performance and manage the loads the occupant experiences in a crash. These include changing the shape, density, chemistry, and position of these energy absorbing materials within the foam bun. However, there is still a need to address the inherent inefficiency of prior art foam energy absorbers.

Interior trim parts often cover structural members that are rigid with blunt edges. These structural members may be in the vicinity of the occupant during daily use as well as in a crash event. Contact with these members in a crash could result in serious injury. Therefore, it is desirable to have an energy absorbing structure which would cushion the occupant during an impact, mitigate some of the impacting forces and reduce the risk of serious injury. Ideally, this energy absorbing structure would be engineered in such a way that it would be able to adapt to the shapes of various structural members one would like to protect. In this way, one tool could produce a product that could be applied to a variety of structural members.

SUMMARY OF THE INVENTION

One aspect of the disclosure includes a multi-faceted energy absorber that lies adjacent to or covers in whole or part a substrate such as but not limited to an automobile seat frame. The absorber when positioned and or secured appropriately cushions a blow in that it protects the substrate, the impacting object or both from damage or injury consequent to impact.

In several embodiments, there is provided an energy absorber with a flexible spine that can be molded in a relatively linear configuration yet has flexibility about one or more axes so as to be bent and thus conform to the mating part. Preferably, the spine can be configured to bend up to 180 degrees about one or more axes depending upon the shape of the structure to be protected. Flexibility between energy absorbing units in combination with the shape and spacing of a trim line between units is also provided.

DETAILED DESCRIPTION

Figure 1:
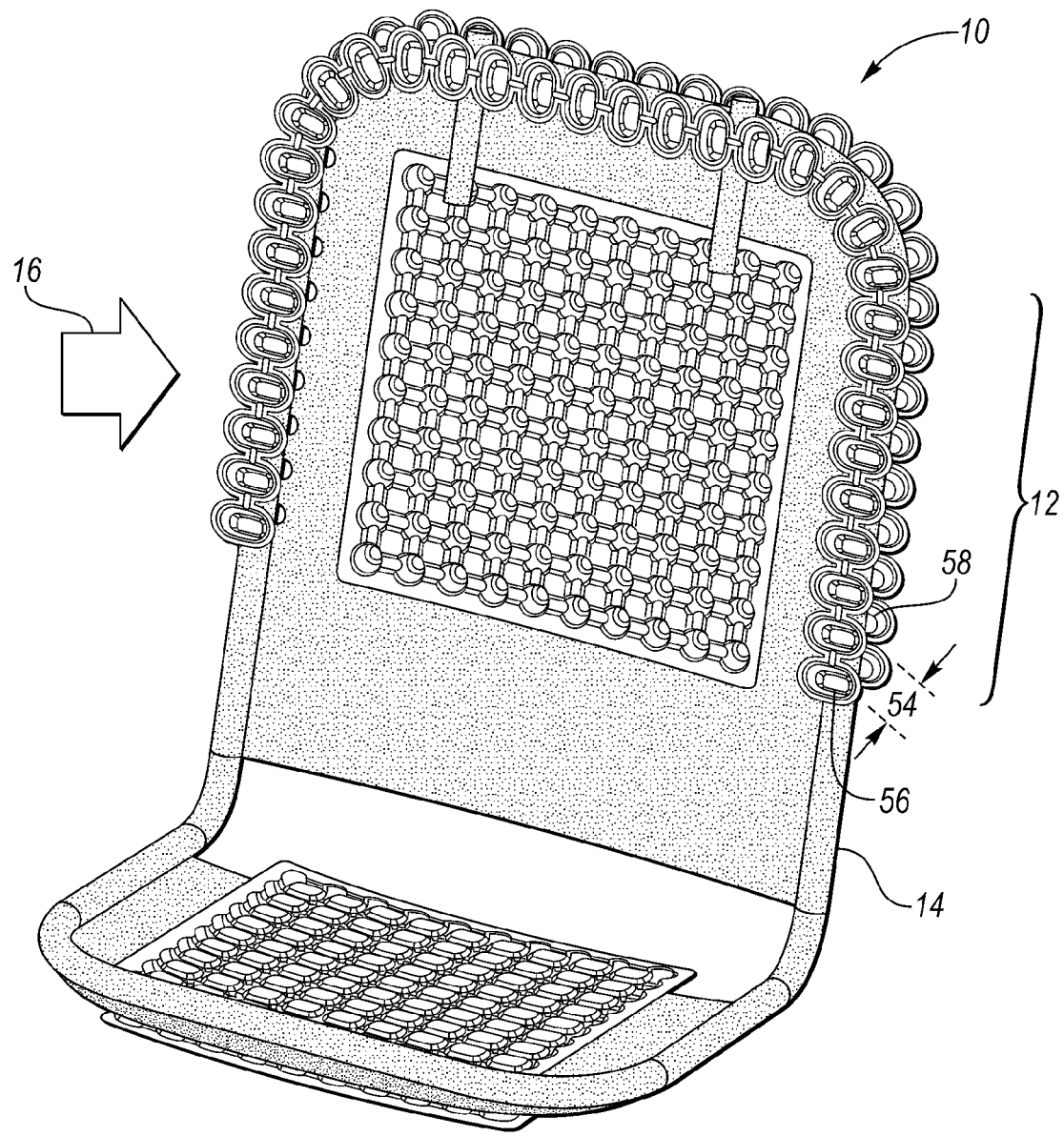
FIG. 1 is a perspective view of an energy absorbing assembly that partially encapsulates a substrate such as a seat frame.
Figure 2:
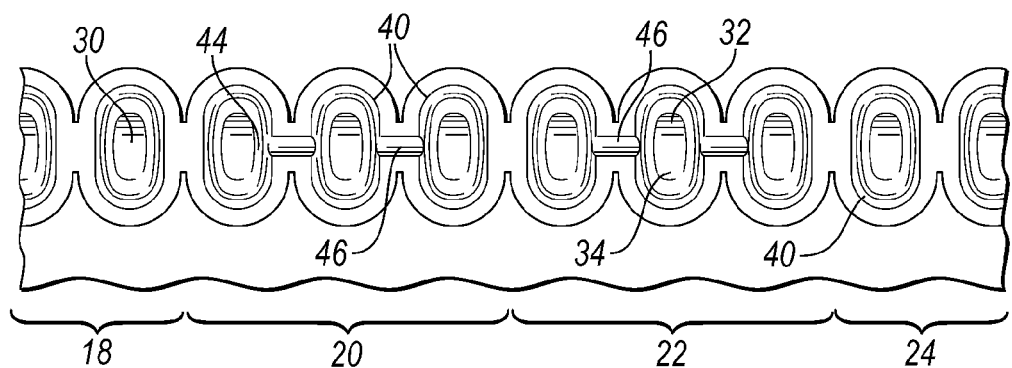
FIG. 2 is a plan view of a section of an energy absorbing assembly.

In FIG. 1 there is depicted an energy absorber 10 that has a spine 12. The spine 12 has a relaxed configuration and a deployment configuration. In the deployment configuration, the spine 12 lies proximate to a substrate 14 to protect the substrate 14 from an impacting object 16. Preferably, the spine 12 is bendable to conform to the substrate 14. The relaxed configuration of the spine has a longitudinal axis (X), a lateral axis (Y) and an orthogonal axis (Z) (FIGS. 1, 2).

The spine includes a number (N) of energy absorbing modules 18, 20, 22, 24, . . . (FIG. 2), where $1 <= N <= 1000$. At least some of the modules have a number (L) of mutually supporting energy absorbing vertebral members 30, where 1<=L<=100. Each vertebral member 30 includes a number (U) of coalesced energy absorbing units 32, 34, were 2<=U<=10. At least some of the energy absorbing units 32, 34 have a base 36 that preferably but not necessarily is oriented toward the impacting object 16.

Figure 3:
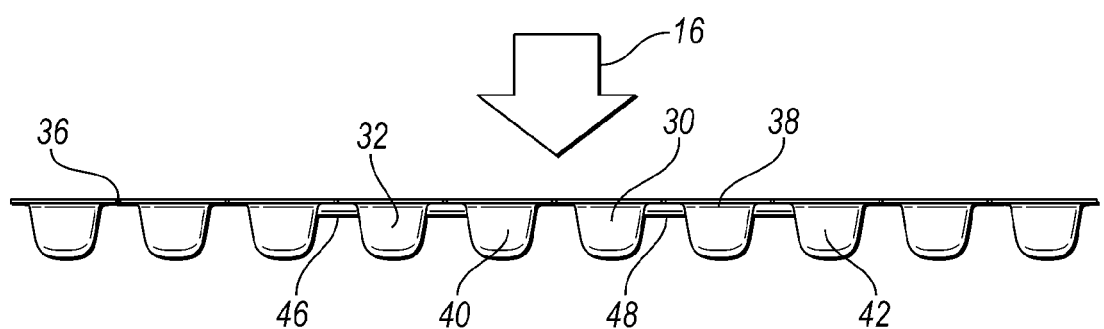
FIG. 3 is a side view thereof.
Figure 4:
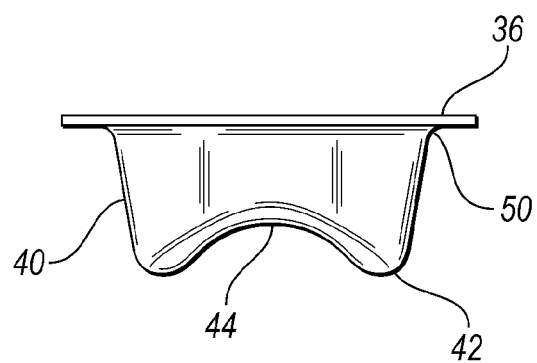
FIG. 4 is an enlarged end view thereof.

Whether manufactured by such processes as thermoforming, vacuum forming or injection molding, an aperture 38 is defined in the base 36 (FIGS. 3, 4). A curvilinear wall 40 extends from the base 36 in a direction away from the impacting object 16. It will be appreciated that in some configurations and applications the base 36 may be oriented toward the impacting object 16.

As shown in FIGS. 1-4, at least some of the coalesced energy absorbing units 32, 34 have a bottom 42 that extends across the curvilinear wall 40 so that the bottom 42 can be positioned toward the substrate 14 to be protected.

Supporting adjacent coalesced energy absorbing units 32, 34 is a shoulder 44 (FIG. 4) that supports adjacent coalesced energy absorbing units 32, 34 in a vertebral member 30. If desired the shoulder 44 can be hunched or curved to mate with the substrate 14. One or more living hinges 46 link adjacent energy absorbing modules 18, 20, 22, 24, . . . or vertebral members 30 within a module 12. The living hinges 46 are flexible about one or more of the longitudinal axis (X), the lateral axis (Y) and the orthogonal axis (Z) of the spine 12 so that in the deployed configuration, the spine 12 can conform by yaw, roll or pitch and otherwise twisting and bending to the substrate 14 as necessary, thereby protecting the substrate 14 and the impacting object 16 while absorbing forces associated with impact.

In some embodiments, each energy absorbing module has an average energy absorbing characteristic (E), the average energy absorbing characteristics (E1, E2) of adjacent energy absorbing modules being the same or different so that the spine 12 has a gradient of energy absorbing characteristics.

In one exemplary embodiment, N=2 and L=1 so that there are two energy absorbing vertebral members 30 in the spine 12. In another case, U=2 so that there is a pair of energy absorbing units 32, 34 in the vertebral member 30.

If the situation warrants it, the shoulder 44 is concave (FIG. 4) so that the shoulder 44 can accommodate a substrate 14 with a convex region (FIG. 1).

To promote stiffness, a rib 46 can optionally be provided that extends between the curvilinear walls 40 of energy absorbing units 32, 34 in adjacent vertebral members 30 in a module. Preferably, the rib 46 has a ceiling 48 that is above the bottom 42 of an energy absorbing unit 32, 34.

It will be appreciated that a skirt 50 (FIG. 4) may extend around a curvilinear wall 40 of an energy absorbing unit 32, 34 between the wall 40 and the base 36.

As suggested in FIG. 3, the bottom 42 is domed or extends convexedly outwards in at least one embodiment.

Referring to FIG. 1, an energy-absorbing assembly 54 can be provided which has a first spine 56, a second spine 58 and a substrate 14 interposed between the first and the second spines 56, 58.

Thus, in several embodiments, there is provided an energy absorber 10 or assembly 54 with one or more flexible spines 12, 54, 58 that can be molded in a relatively linear configuration. The absorber 10 has flexibility about one or more axes so as to contort and conform to the mating part. Preferably, the spine 12 can be configured to bend up to 180 degrees about one or more axes depending upon the shape of the structure 14 to be protected. Flexibility between modules or energy absorbing units within a module in combination with the shape and spacing of a trim line between units is also provided.

In one embodiment, a spine section 12 is provided without an interconnecting rib 46. This spine section 12 is most flexible about its longitudinal axis. A spine section 12 with an interconnecting rib 46 is most flexible at angles to either side of the spine 12 since the rib 46 provides a collapsing or expanding section that can distort between energy absorbing units 32, 34. By either imparting ribbed sections or eliminating ribbed sections along the longitudinal axis of the spine 12 in combination with the trim profile, the absorber 10 can be molded linearly in one die draw but compelled to bend as desired to protect a particular member 14. Rectangular absorbers in one die draw offer more favorable forming economics and minimize tool complexity.

Some means of retaining the absorber 12 in its installed position is desirable. The product may be in-molded during the foaming cycle wherein the absorber(s) 10 is positioned in the mold prior to foaming. Using a foam locating scheme relative to a seat frame for example serves to position the energy absorber 12 relative to the frame 14. Other traditional means for attaching may also be selected such as welding, snapping, push pins, clips, Velcro and the like.

In some embodiments (see, e.g., FIGS. 5, 6), the energy absorber 12 is integrated into either a seat cushion 52 or into the seat itself. The designer thus offers the possibility of using thermoplastic polyurethane (TPU) as an integral part of a seat component, such as a head rest or seat back or seat cushion. If at least some of the seat components are molded from for example TPU, the energy absorber 12 can be integrated into at least a part of the seat component 52.

Preferably, the energy absorber 12 is molded in the same step as molding the seat component 52. The energy absorber 12 can then be coordinated with a seat component 52 such as the cushion about the skirt 50. Optionally, a tether is provided which allows the energy absorber 12 to coordinate with the seat component, e.g., cushion 52. As used herein the term "tether" includes a connection seam 56 alone or a structure with an elongate spacer 58 having a flexible or rigid connection seam 56 at either or both ends.

Figure 5:
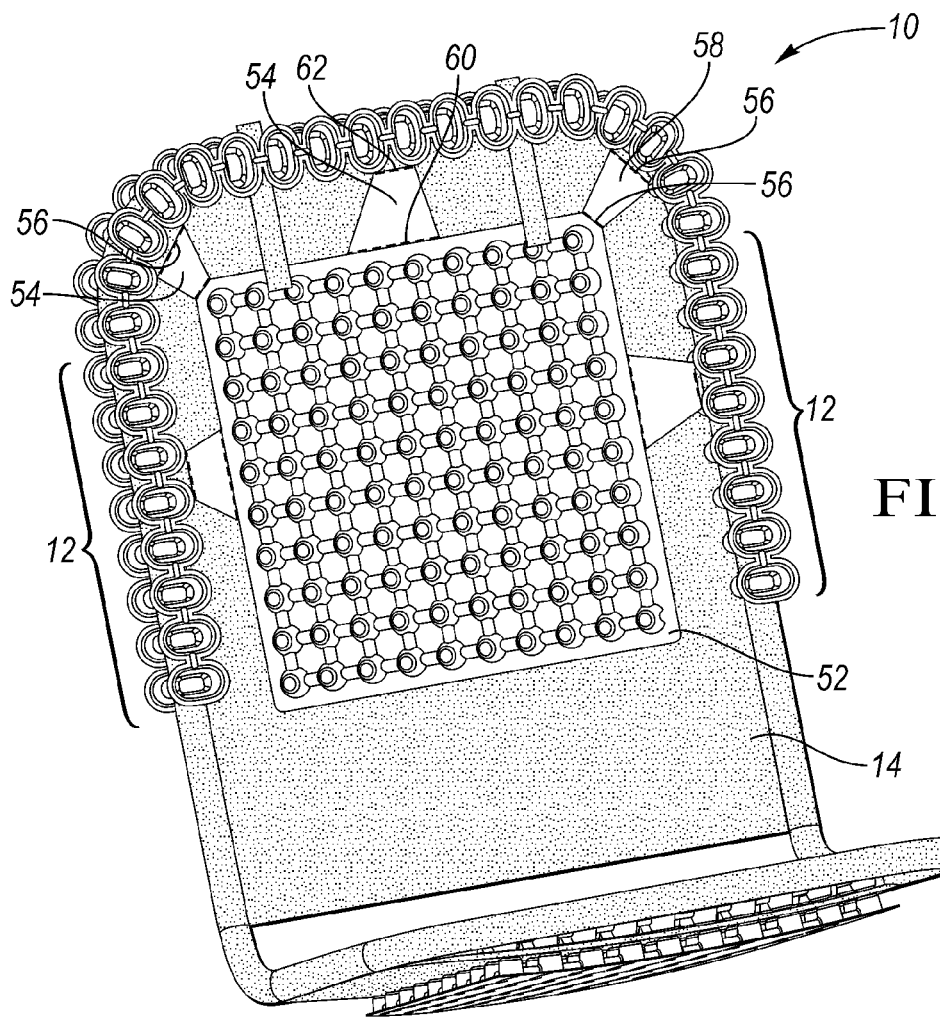
FIG. 5 is an alternate embodiment that resembles the view of FIG. 1.
Figure 6:
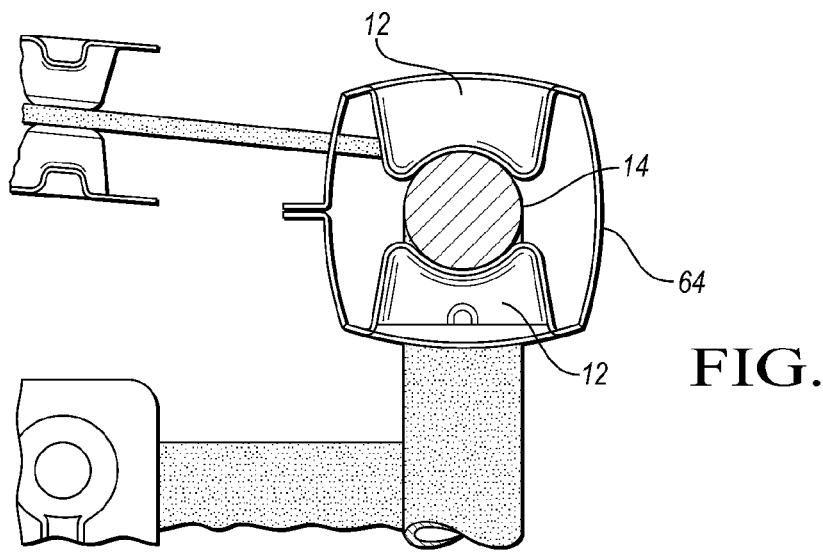
FIG. 6 is a sectional view of a clamshell configuration.

FIG. 5 shows an embodiment in which a tether 54 extends from the seat cushion 52 outwardly to the energy absorber 12 that is deployed around at least a part of the seat frame 14. If there is an elongate spacer 58 having a flexible or rigid connection seam 56 at either end, respectively, the seams 56 are associated with the energy absorber 12 and the seat cushion 52 (FIG. 5). As shown, each elongate spacer 54 has an inboard edge 60 and an outboard edge 62. For a given spacer 54, the inboard edge 60 may be wider than the outboard edge 62 or not.

In another embodiment (FIG. 6) the energy absorbers 12 are positioned on opposing sides of a substrate, such as a seat frame 14. In one example, energy absorbers 12 positioned at opposite faces of, for example, a seat frame are connected to each other, much like a clamshell. A bridge portion 64 is provided between opposing energy absorbers 12. In this embodiment, a subassembly comprises two energy absorbers 12 that are connected by the bridge portion 64. The subassembly effectively wraps around at least a part of the substrate 14. If desired the subassembly can be attached to the substrate by convention attachment methods.

In practice, one tool may produce energy absorbers that can wrap around complex geometries 14 like seat back frames, headrest frames, 90 degree metal corners, etc. and apply to multiple programs, thereby minimizing tooling investment. For example, a right/left tool might be used to make an energy absorber 12 for seat backs and frames and an up/down tool might be used for corners and trim. Such absorbers can be insert-molded during the foaming process. If desired, polypropylene components can be welded to the interior trim. Thus there is provided a common tool for multiple applications.

Additionally, several embodiments of the invention have proven to be more efficient than foam in absorbing energy. The space saved can be used to improve safety, and create a more spacious interior, especially in shorter cars and lighter weight vehicles.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An energy absorber in combination with a seat component and a substrate to be protected, the energy absorber having
   a spine with a relaxed configuration and a deployment configuration, so that in the deployment configuration, the spine lies adjacent to the substrate to protect the substrate from an impacting object, the spine being bendable to conform to the substrate, the relaxed configuration of the spine having a longitudinal axis, a lateral axis and an orthogonal axis, the spine comprising a thermoplastic polyurethane (TPU) and including
   a number (N) of energy absorbing modules, where $1<=N<=1000$, at least some of the modules having
   a number (L) of mutually supporting energy absorbing vertebral members, where $1<=L<=100$;
   at least some of the vertebral members, including a number (U) of coalesced energy absorbing units, were $2<=U<=10$, at least some of the energy absorbing units including
   a base that is oriented toward the impacting object,
   a curvilinear wall extending from the base in a direction away from the impacting object, and
   a bottom that extends across the curvilinear wall at a bottom end thereof so that the bottom can be positioned toward the substrate to be protected;
   a curved shoulder in at least some vertebral members that lies between adjacent coalesced energy absorbing units, the curved shoulder being adapted to allow the at least some vertebral members to be placed adjacent to the substrate; and
   one or more living hinges that link adjacent energy absorbing vertebral members, the living hinges being flexible about one or more of the longitudinal axis, the lateral axis and the orthogonal axis of the spine so that in the deployed configuration, the spine can protect the substrate, and absorb forces associated with impact,
the substrate including a seat frame with a cylindrical member, a portion of the cylindrical member being placed adjacent to the spine, a pair of spines being provided on opposed sides of the cylindrical member,
the seat component being selected from the group consisting of a seat cushion, a seat back, and a headrest, and
a tether that extends from a seat component to the substrate.

2. The energy absorber of claim 1, wherein
each energy absorbing module has an average energy absorbing characteristic (E), the average energy absorbing characteristics (E1, E2) of adjacent energy absorbing modules being different so that the spine has a gradient of energy absorbing characteristics.

3. The energy absorber of claim 1, wherein
there is a pair of energy absorbing units in the vertebral member.

4. The energy absorber of claim 3, wherein
the shoulder is concave so that the shoulder can accommodate a substrate with a convex region.

5. The energy absorber of claim 1, further including
a rib that extends between the curvilinear walls of energy absorbing units in adjacent vertebral members in a module.

6. The energy absorber of claim 5, wherein
the rib has a ceiling that is below the bottom of an energy absorbing unit.

7. The energy absorber of claim 1, further including
a skirt that extends around a curvilinear wall of an energy absorbing unit between the wall and the base.

* * * * *